INVENTORS
Klaus Bomhardt
Rolf Hartrumpf
Josef Neuhauser &
Peter Lackner
BY Spencer & Kaye
ATTORNEYS INVENTORS
Klaus Bomhardt
Rolf Hartrumpf
Josef Neuhauser &
Peter Lackner BY Spencer & Kaye
ATTORNEYS INVENTORS
Klaus Bomhardt
Rolf Hartrumpf
Josef Neuhauser &
Peter Lackner
BY Spencer & Kaye
ATTORNEYS INVENTORS
Klaus Bomhardt
Rolf Hartrumpf
Josef Neuhauser &
Peter Lackner
BY Spencer & Kaye
ATTORNEYS United States Patent Office
3,289,123
Patented Nov. 29, 1966

3,289,123

TANK CIRCUIT WITH BAND SELECTION SWITCH AND CAPACITIVE TUNING MEANS

Klaus Bomhardt, Rolf Hartrumpf, Josef Neuhauser, and Peter Lackner, all of Heilbronn, Germany, assignors to Telefunken Patentverwertungsgesellschaft m.b.H., Ulm (Danube), Germany Filed Feb. 1, 1965, Ser. No. 429,240
Claims priority, application Germany, Feb. 1, 1964, T 25,536; Sept. 2, 1964, T 26,926
21 Claims. (Cl. 334—19)

The present invention relates to a piece of communication equipment incorporating a tank circuit.

More particularly, the present invention relates to a piece of communication equipment capable of receiving electromagnetic radiation transmitted throughout a wide frequency band, or in widely spaced apart frequency bands, as, for example, antenna amplifiers, input circuits for television receivers, and the like.

In order to enable such a piece of communication equipment to receive transmission throughout the entire frequency band without appreciable amplification loss, the same may, for instance, be equipped with a so-called coil drum, i.e., a drum which carries a plurality of resonant circuit inductances each of which can, by rotating the drum, be connected in circuit with a stationary capacitance. Each of the individual coils has such an inductance as to form together with the stationary capacitance a resonant circuit tuned to a respective one of the channels within the band.

Many television receivers are designed so as to be able to receive both VHF (very-high frequency) and UHF (ultra-high frequency) television broadcasts, the VHF range being that portion of the frequency spectrum which is between 30 and 300 megacycles and the UHF range being that portion of the frequency spectrum which is between 300 and 3,000 megacycles. In European television broadcasting systems, the spectrum is divided into Bands I, III and IV/V, Band I designating a frequency range of 68 to 41 megacycles (wave length: 4.41 to 7.32 meters), Band III designates a frequency range of 174 to 223 megacycles (wave length: 1.35 to 1.72 meters) and Band IV/V designates a frequency range of 470 to 790 megacycles (wave length: 38 to 63.8 centimeters). Bands I and III thus fall into the VHF range, while Band IV/V falls into the UHF range. Within each band there are a certain number of individual channels, i.e., narrow frequency bands, each used for transmitting and receiving a typical television broadcast. According to North American standards, the VHF range includes Channels 2 to 6, occupying the region from 54 to 88 megacycles, and Channels 7 to 13 occupying the 174 to 216 megacycle region, while the UHF range includes Channels 14 to 83 occupying the 470 to 890 megacycle region.

In practice, television receivers can receive VHF signals by using lumped circuit components, while the reception of UHF generally entails the use of distributed circuit elements. To enable any one receiver to pick up both VHF and UHF signals, it may be provided with a tuning capacitance common for both VHF and UHF reception. For UHF reception, this common tuning capacitance is connected to an inductance constituted by the inner conductor of a tank circuit, which inductance is designed for UHF reception but which, when VHF is to be received, has selected lumped inductances connected to it so that, for VHF operation, the inner conductor of the tank circuit serves merely as an electric lead. Such tuners have been found to entail a number of drawbacks.

It is, therefore, the primary object of the present invention to provide an improved tank circuit by means of which a television receiver or other piece of communication equipment can be tuned in both the lower and higher frequencies, i.e., both the VHF and UHF regions, such tank circuits being of particular significance in view of existing regulations that require television receivers to be able to receive both VHF and UHF.

Accordingly, the present invention resides in a tank circuit, suitable for use in a piece of communication equipment, which tank circuit has an outer conductor and an inner conductor, there being capacitative tuning means arranged in the region of one end of the inner conductor and an inductance interposed between the other end of the inner conductor. When the tank circuit operates in the region of the lowest frequency, the inner conductor serves as a lead for the inductance. According to the present invention, there are means for selectively short-circuiting the inner conductor to the outer conductor, at any one of a plurality of, i.e., two or more, points along the length of the inner conductor, thereby to enable the tank circuit to operate in higher frequency ranges.

Additional objects and advantages of the present invention will become apparent upon consideration of the following description when taken in conjunction with the accompanying drawings in which.

Figure 1:
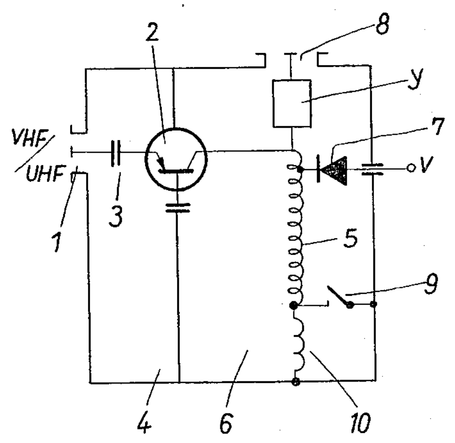
FIGURE 1 is a schematic circuit diagram showing the principle of operation of a tank circuit according to the present invention.

Referring now to the drawings and to FIGURE 1 thereof in particular, the same shows a VHF and UHF amplifier comprising an input connection 1 and a transistor 2 to which the input signals are applied from the input connection via a capacitor 3. The transistor 2 is arranged in a housing 4 and has its collector connected to the upper end of a quarter wave-length inner conductor 5, the latter forming together with distributed capacitances of the chamber or tank 6, a resonant circuit. This resonant circuit is tuned by means of a capacitor, such as a capacitance diode 7, arranged at or near one end of the inner conductor 5. The output signals are taken off, via a circuit Y, at an output connection 8. The output circuit Y is so designed that the output will be matched over the entire frequency band over which the amplifier is to act. As will be described below, in conjunction with FIGURES 4, 5 and 6, the circuit Y may, for example, contain two reactances.

The arrangement described so far, which is suited for amplifying UHF signals, is additionally provided with a switch 9 and a lumped inductance 10. The switch 9 is open when the amplifier is to amplify UHF signals and closed when the amplifier is to amplify VHF signals. The inductance 10 has such a value that the capacitance diode 7 can be used to tune the amplifier over the VHF range, or at least over so much of the VHF band as is needed to enable the amplifier to operate in conjunction with the particular piece of communication equipment with which it is used.

The switch 9 may, as will be described in conjunction with FIGURES 2 and 3, be constituted by a slide-type switch or by a push-button switch, which itself may, for example, be coupled with other controls. Alternatively, the switch 9 may, as will be described in conjunction with FIGURES 7, 8 and 9, be constituted by a diode having a low bulk resistance and which can readily be remotely controlled by means of a direct current potential. It is also possible to provide the inner conductor 5 with a slidably displaceable short-circuit in the form of a coaxial sleeve. The latter will, in practice, also encompass the inductance 10.

Figures 2, 3:
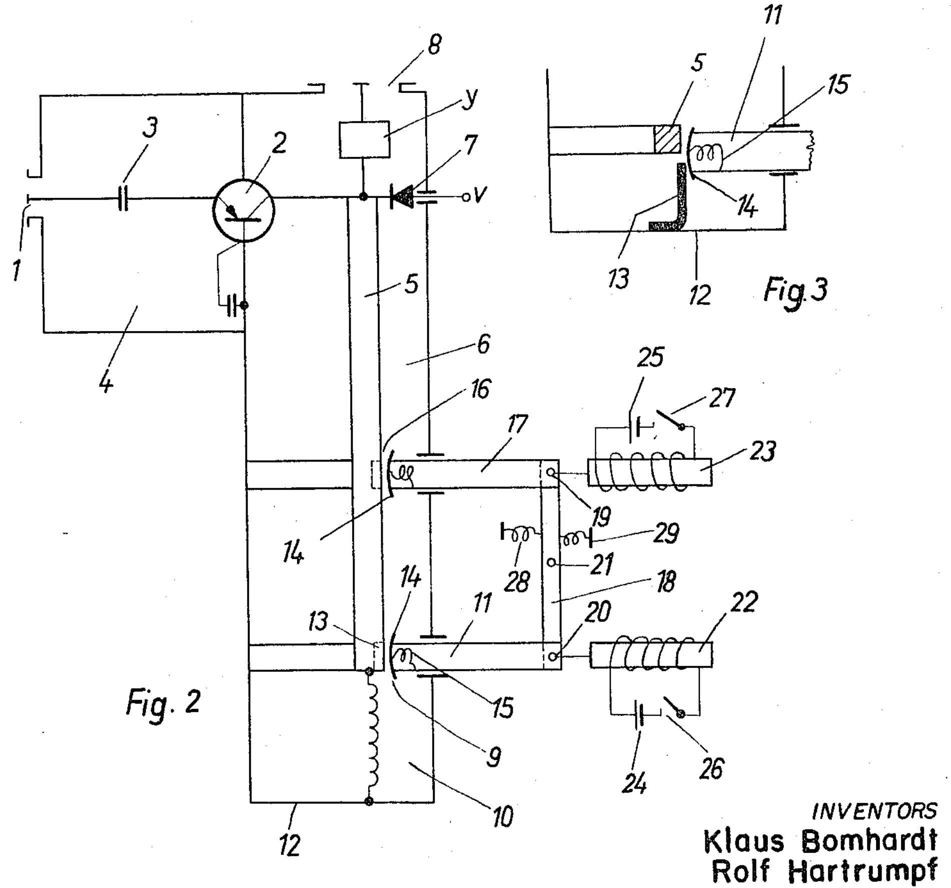
FIGURE 2 is a circuit diagram of a practical embodiment of a tank circuit according to the present invention.
FIGURE 3 is a side elevational view, partly in section, showing a detail of the tank circuit of FIGURE 2.

In the amplifier shown in FIGURES 2 and 3, in which like reference numerals identify the same parts as in FIGURE 1, the amplifier includes a quarter wave-length tank circuit 5, 6, and a lumped inductance 10 connected in series with the inner conductor 5. The switch 9, by means of which the amplifier is switched over between VHF and UHF operation, is arranged at the base of the inner conductor 5 and is constituted by the conductor 5 itself, a slide 11, and a stationary contact 13 which itself is fixed to the wall of the housing 12. The contact 13 is preferably resilient, and is relatively short. As is apparent from FIGURE 3, the contact 13 lies next to the inner conductor 5 such that air gaps between the conductor 5 and the contact 13 can be bridged by the slide 11. The bridging contact 14 forming part of the slide 11 is, in practice, resiliently mounted, as, for example, by means of a spring 15. The arrangement shown in FIGURE 3 has an especially low capacitance when the switch is not in short-circuit position.

At times it is advantageous if the contact 13 is longer than depicted in FIGURE 3 so as to extend to a point somewhat to the right of and on the same level as the conductor 5, so that when the slide 11 is pushed leftwardly, as viewed in FIGURE 3, the contact 13 is pressed against the conductor 5. That is to say, the contact 13 itself can be arranged so as physically to contact the conductor 5 upon actuation of the switch 11. Here, it may be necessary, in order to reduce the capacitance, somewhat to deform the contact 13, or to provide the conductor 5 with a certain bias or the like.

The arrangement shown in FIGURES 2 and 3 may be provided with an additional switch 16 which is similar in construction to switch 11 and which allows the conductor 5 to be short-circuited to the outer conductor 6 at more than one point along the length of conductor 5, so as to provide more than two frequency range settings. The slide 17 of switch 16 may be connected with the slide 11 of switch 9 by means of a lever 18 which itself is pivotally mounted on a pivot point 21 and whose ends are connected to the slides 11 and 17 at points 20 and 19, respectively. The elements 11, 18, 17, thus form a scale-like linkage; when the switch 9 is closed, the switch 16 perforce opens, and vice versa.

Also shown are electromagnets 22, 23, which serve to actuate the switches 9 and 16, respectively. The electromagnets are energized by means of suitable power supplies 24, 25, which are connected across the respective electromagnets by means of respective switches 26, 27, the latter preferably being coupled with push buttons by means of which the amplifier is switched between VHF and UHF operation.

Alternatively, the switches 9, 16, may be actuated mechanically directly from the push buttons.

Furthermore, the two electromagnets 22, 23, may be replaced by a single magnet which, by being suitably energized with the proper polarity, can be made to pivot the lever 18 in either direction.

Also shown are return springs 28 and 29 which serve to hold the lever 18 in a neutral position, when neither of the two switches 9, 16, is to be closed.

Figure 4:
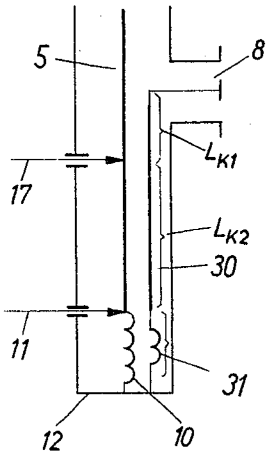
FIGURE 4 is a circuit diagram showing one embodiment of a coupling circuit suitable for use in a tank circuit according to the present invention.

As set forth above, the output is to be taken off via a circuit Y which provides frequency matching over the entire frequency range through which the amplifier is to operate. To this end, the output connection 8 of the amplifier shown in FIGURE 4 is connected with a coupling loop 30 whose other end is grounded via an inductance 31. The coupling loop 30 and the inductance 31 lie close to the inner conductor 5 and the inductance 10, respectively, as shown in FIGURE 4. Insofar as the amplification of the lower (VHF) frequencies is concerned, only the inductance 10 will have any significant effect, so that the output signals reach the output connection 8 via the coupling between the inductances 10 and 31. For the middle frequencies, e.g., the signals in the lower portion of the UHF band (comparable to Band IV, as described above), the base point of the inner conductor 5 is short-circuited by means of the switch 11, so that output signals reach the connection 8 as a result of coupling between the inner conductor 5 and the coupling loop 30. Finally, for the high frequencies, namely, the signals in the higher portion of the UHF band (comparable to Band V, as described above), the inner conductor 5 is short-circuited in the region of its center. Here, the lower part $L_{K2}$ of the coupling loop 30 and the inductance 31 will have virtually no effect, so that the only coupling which exists is that obtained between the upper portion of the inner conductor 5 and the upper portion $L_{K1}$ of the coupling loop 30.

Instead of there being inductive coupling, the lower frequencies may be passed on by coupling the loop 30 to a tap of the inductance 10.

Figure 5:
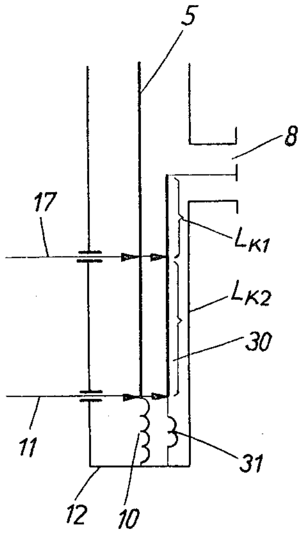
FIGURE 5 is a circuit diagram showing another embodiment of a coupling suitable for use in a tank circuit according to the present invention.

FIGURE 5 shows another embodiment of the coupling-out circuit Y. Here, portions of the coupling loop are short-circuited together with the corresponding portions of the conductor 5, so that the coupling can be adjusted separately for each frequency range. Here, too, the separate coil 31 may be replaced by a tap of the inductance 10.

Figure 6:
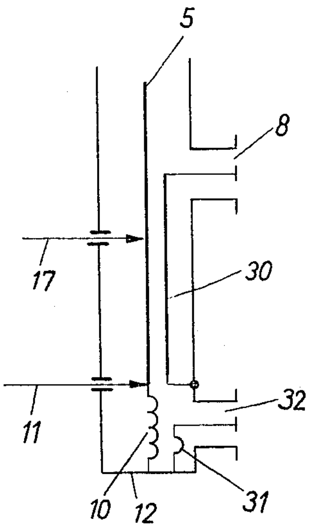
FIGURE 6 is a circuit diagram showing still another embodiment of a coupling circuit suitable for use in a tank circuit according to the present invention.

In the embodiment of FIGURE 6, the lower frequencies, i.e., the VHF frequencies, and the higher frequencies, i.e., the UHF frequencies, are coupled out separately. The higher frequencies are taken out via the output connection 8 and the coupling loop 30, while the lower frequencies are taken out via a separate output connection 32 which is coupled to the inductance 10, either via inductance 31, as shown, or by being connected to a tap of the inductance 10, as shown in FIGURE 5.

Figure 7:
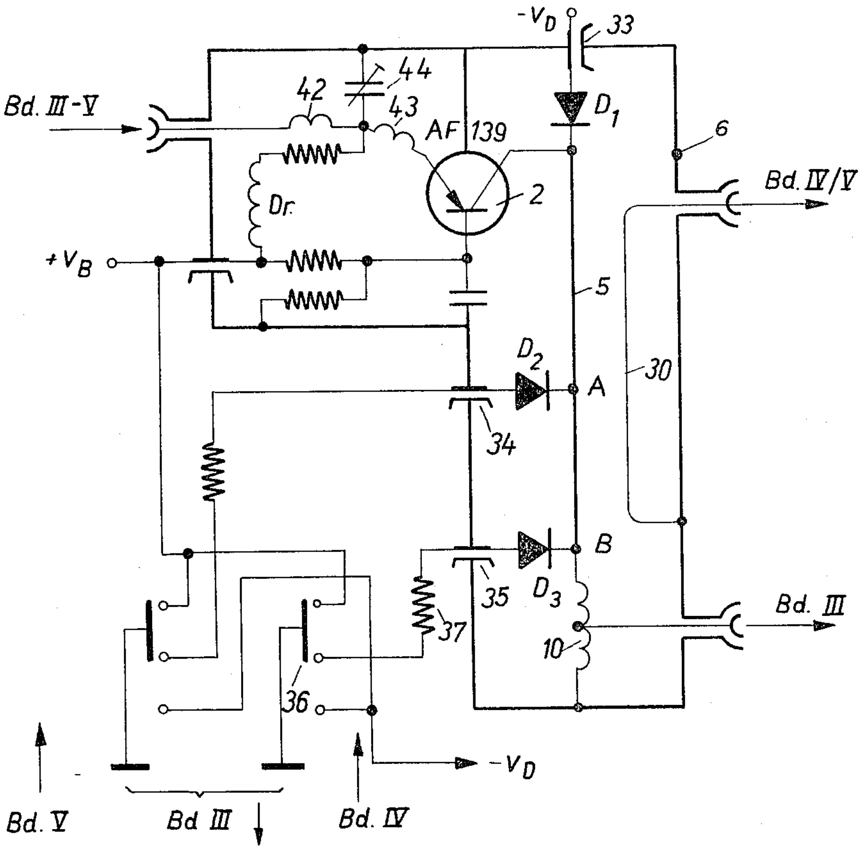
FIGURE 7 is a schematic circuit diagram of a tank circuit according to the instant invention, and shows the arrangement of capacitance diodes.

FIGURE 7 shows a VHF/UHF amplifier to whose transistor 2 the input signals are applied via a wide-band T-network comprising inductances 42 and 43 and a trimmer capacitor 44. The transistor 2 is connected in common-base configuration, the collector being connected to the upper end of the inner conductor 5, whose lower end, as in the previously described embodiments, is connected in series with an inductance 10. The resonant circuit is tuned by means of three capacitance diodes $D_1$, $D_2$, $D_3$, arranged as follows: One terminal of diode $D_1$ is connected to the collector-end of the inner conductor 5 and the other terminal of the diode $D_1$ is connected to the lead-in capacitance 33. The second diode $D_2$ has one terminal connected to an appropriately selected point A of the conductor 5 and the other terminal to the lead-in capacitance 34. The third diode $D_3$ has one terminal connected to the juncture point B at which the conductor 5 joins the inductances 10, while the other terminal of diode $D_3$ is connected to the lead-in capacitance 35.

FIGURE 7 also shows separate outputs for the higher and lower frequencies (cf. FIGURE 6), the coupling inductance 31 having been replaced by a tap on inductance 10.

When the amplifier is to operate in its lowest range, e.g., Band III, the three tuning diodes have applied to them a voltage $-V_D$ which renders the diodes non-conductive.

This voltage $-V_D$ is variable for purposes of tuning. The output circuit is so designed that, when $V_D=-2v.$, it is tuned to the lowest frequency of the lowest frequency band (in the instant example, Band III). If the diodes are constituted by Telefunken BAY 70 diodes, the capacitance of each diode $C_s$ will be about 5 picofarads, i.e., the tuning capitance will be about 15 picofarads. The amplified signals, in Band III, are coupled out via the tap of the inductance 10. When the amplifier is to operate in the middle range (in the instant example, the UHF Band IV), the tuning diode $D_3$ is biassed in forward direction, this being effected by means of the switch 36 which applies the positive operating voltage $+V_B$ of the amplifier. A current-limiting resistance 37 is provided in order to prevent the diode current from exceeding a given value, for example 50 milliamperes.

The equivalent circuit of the diode, when operated in reverse direction, is, in the case of the mentioned BAY 70 diode ($V_D=-2v.$), that which is represented, approximately, by the series circuit of an inductance $L_S \approx 5$ nanohenries, a bulk reistance $R_S \approx 1$ ohm, and a capacitance $C_s=5$ picofarads.

The equivalent circuit of the same diode operated in forward direction is the series circuit of an inductance $L_S=5$ nanohenries with a series resistance $R_S \approx 2$ ohms and a diffusion capacitance $C_D \approx 2$ nanofarads.

In forward direction, the diode $D_3$, insofar as high frequencies are concerned, represented as a small, grounded inductance, which, for all practical purposes, shunts the inductance 10. This renders the output circuit of the amplifier a quarter wave-length circuit which is tuned by the didoes $D_1$ and $D_2$, the same being biassed in forward direction. The resulting tuning capacitance, taken with respect to the same reverse voltage, will have decreased by an amount equal to the tuning capacitance $D_3$ and hence be matched to the higher frequency range of the amplifier.

When the amplifier is to operate in the highest range, e.g., the higher UHF Band V, the diode $D_2$ will also be biassed in forward direction. As a result, a small additional inductance is connected between the conductor 5 and ground so that the frequency range of the amplifier is increased. Now, only the diode $D_1$ acts as a tuning diode, whereby—again with respect to the same operating point—the resulting circuit capacitance is decreased further, which is suitable for the selected frequency range. The amplified UHF signals of Bands IV and V are coupled out via the coupling loop 30.

Figure 8:
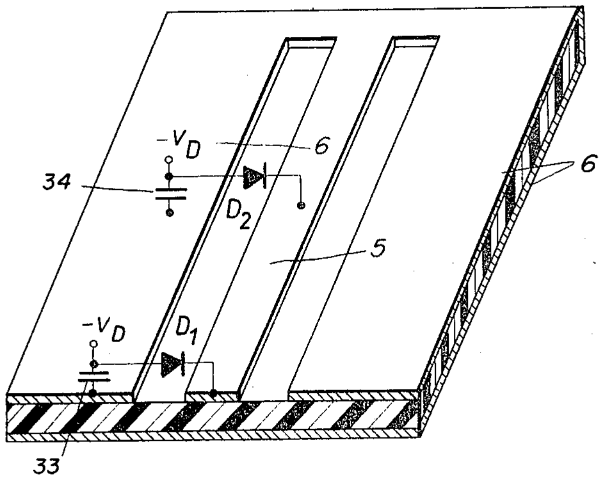
FIGURE 8 is a perspective view, partly in section, showing one embodiment of a practical arrangement of a tank circuit according to the present invention.

The amplifier described above can readily be made of printed or etched circuitry, since it can be tuned by exclusively electronic means, that is to say, without any mechanical moving parts. This is illustrated in FIGURE 8 which shows a quarter wave-length tank circuit that can be used as the input circuit of an amplifier according to the present invention and that can be tuned over, for example, two frequency bands by means of tuning diodes $D_1$ and $D_2$. The quarter wave-length tank circuit itself comprises the inner conductor 5 and the outer conductor 6, the tank circuit being applied on a low-loss dielectric material, e.g., a plastic plate, made, for example of "Teflon" (polymerized tetrafluoroethylene), which plate is copper-coated on both sides. The diodes $D_1$ and $D_2$ are connected to the outer conductor 5, insofar as alternating current is concerned, by means of the lead-in capacitors 33 and 34, respectively, described above in connection with FIGURE 7. For operation in the lower portion of the UHF region, for example Band IV, the diodes $D_1$ and $D_2$ are connected to variable tuning voltages. Both diodes serve to vary the resonant frequency of the tank circuit. For operation in the UHF higher frequency region, for example Band V, the diode $D_2$ is biassed in forward direction, so that the resonant frequency of the tank circuit in increased.

Figure 9:
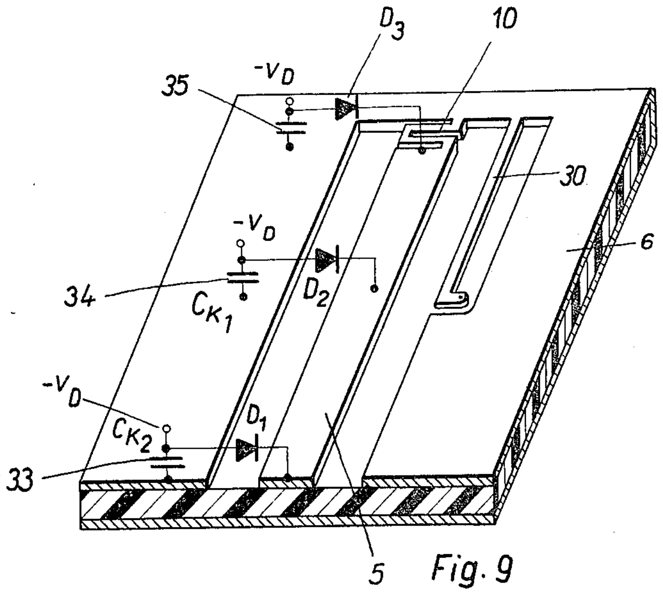
FIGURE 9 is a perspective view, partly in section, showing another embodiment of a practical arrangement of a tank circuit according to the present invention.

FIGURE 9 shows a further development of the tank circuit of FIGURE 8 and incorporates the three diodes $D_1$, $D_2$, $D_3$, according to FIGURE 7. FIGURE 9 shows the same components as FIGURE 8, as well as the third diode $D_3$, its lead-in capacitance 35, and also the inductance 10 and the coupling loop 30.

It will be appreciated that the present invention is not limited to amplifiers but is equally applicable to tuners as such.

It will be understood that the above description of the present invention is susceptible to various modifications, changes, and adaptations, and the same are intended to be comprehended within the meaning and range of equivalents of the appended claims.

What is claimed is:

1. For use in a piece of communication equipment, a tank circuit comprising, in combination:

(a) an outer conductor;

(b) an inner conductor arranged within said outer conductor;

(c) capacitative tuning means connected to said inner conductor in the region of one end thereof;

(d) an inductance interposed between the other end of said inner conductor and said outer conductor; said inner conductor, when the tank circuit operates in the region of the lowest frequency, serving as a lead for said inductance; and (e) means for selectively short-circuiting said inner conductor to said outer conductor at any one of a plurality of points along the length of said inner conductor, thereby to enable the tank circuit to operate in higher frequency ranges, said short-circuiting means comprising two short-circuit slides each movable between open and closed positions in which latter they engage said inner conductor at different points along its length, and linkage means interconnecting said slides for causing one of said slides to be in its open position while the other of said slides is in its closed position.

2. A tank circuit as defined in claim 1 wherein said short-circuiting means further comprise return spring means for maintaining said linkage in a position wherein both of said slides are in their respective open positions.

3. A tank circuit as defined in claim 1 wherein said short-circuiting means further comprise electromagnet means for actuating said linkage to move said slides into their respective positions.

4. A tank circuit as defined in claim 1 wherein said short-circuiting means include stationary contact means arranged in said tank circuit and in contact with said outer conductor thereof in the vicinity of the respective point whereat said inner conductor is to be short-circuited, and wherein each respective slide includes means for causing electrical contact between the respective stationary contact and said inner conductor.

5. A tank circuit as defined in claim 4 wherein said stationary contact means extend into the path of movement of the respective slide and, upon movement of the latter to its closed position, are pushed thereby for engaging said inner conductor.

6. A tank circuit as defined in claim 5 wherein said stationary contact means are resilient.

7. A tank circuit as defined in claim 4 wherein each slide includes contact means for bridging said stationary contact means and said inner conductor.

8. A tank circuit as defined in claim 7 wherein said contact means carried by said slide are yieldably mounted.

9. For use in a piece of communication equipment, a tank circuit comprising, in combination:

(a) an outer conductor;

(b) an inner conductor arranged within said outer conductor;

(c) capacitative tuning means connected to said inner conductor in the region of one end thereof;

(d) an inductance interposed between the other end of said inner conductor and said outer conductor; said inner conductor, when the tank circuit operates in the region of the lowest frequency, serving as a lead for said inductance; and (e) means for selectively short-circuiting said inner conductor to said outer conductor at any one of a plurality of points along the length of said inner conductor; thereby to enable the tank circuit to operate in higher frequency ranges, said short-circuiting means comprising two short-circuit slides each movable between open and closed positions in which latter they engage said inner conductor at different points along its length, each slide having associated with it an electromagnet and a return spring.

10. For use in a piece of communication equipment, a tank circuit comprising, in combination:

(a) an outer conductor;

(b) an inner conductor arranged within said outer conductor;

(c) capacitative tuning means connected to said inner conductor in the region of one end thereof;

(d) an inductance interposed between the other end of said inner conductor and said outer conductor; said inner conductor, when the tank circuit operates in the region of the lowest frequency, serving as a lead for said inductance;

(e) means for selectively short-circuiting said inner conductor to said outer conductor at any one of a plurality of points along the length of said inner conductor, thereby to enable the tank circuit to operate in higher frequency ranges; and (f) an output circuit which has a matched output over the entire frequency range through which the tank circuit is to operate said output circuit comprising a coupling loop and an output inductance, said coupling loop and said output inductance being connected in series-circuit with each other, said coupling loop being arranged next to said inner conductor and said output inductance being arranged next to said inductance which is interposed between said other end of said inner conductor and said outer conductor.

11. A tank circuit as defined in claim 10 wherein said short-circuiting means include means for simultaneously short-circuiting said inner conductor and said coupling loop.

12. For use in a piece of communication equipment, a tank circuit comprising, in combination:

(a) an outer conductor;

(b) an inner conductor arranged within said outer conductor;

(c) capacitative tuning means connected to said inner conductor in the region of one end thereof;

(d) an inductance interposed between the other end of said inner conductor and said outer conductor; said inner conductor, when the tank circuit operates in the region of the lowest frequency, serving as a lead for said inductance;

(e) means for selectively short-circuiting said inner conductor to said outer conductor at any one of a plurality of points along the length of said inner conductor, thereby to enable the tank circuit to operate in higher frequency ranges; and (f) an output circuit which has a matched output over the entire frequency range through which the tank circuit is to operate, said output circuit comprising first and second output connections, a coupling loop which is electrically connected between said first output connection and said outer conductor and which is physically arranged in the region of said inner conductor, and an output inductance which is electrically connected between said second output connection and said outer conductor and which is physically arranged in the region of said inductance (d).

13. For use in a piece of communication equipment, a tank circuit comprising, in combination:

(a) an outer conductor;

(b) an inner conductor arranged within said outer conductor;

(c) capacitative tuning means connected to said inner conductor in the region of one end thereof;

(d) an inductance interposed between the other end of said inner conductor and said outer conductor; said inner conductor, when the tank circuit operates in the region of the lowest frequency, serving as a lead for said inductance; and (e) means for selectively short-circuiting said inner conductor to said outer conductor at any one of a plurality of points along the length of said inner conductor, thereby to enable the tank circuit to operate in higher frequency ranges, said short-circuiting means comprising controllable diode means.

14. A tank circuit as defined in claim 13 wherein said diode means comprise a capacitance diode, wherein said capacitative tuning means comprise a diode, and wherein means are provided for applying a variable tuning voltage for tuning said tuning diode when the tank circuit is to operate at the lower frequencies and for biassing said tuning diode in forward direction when the tank circuit is to operate at the higher frequencies.

15. A tank circuit as defined in claim 14 wherein said two diodes are effectively in parallel with each other.

16. A tank circuit as defined in claim 14 wherein said short-circuiting means include at least one further diode for enabling the tank circuit to operate in more than two frequency ranges, there being means for applying said tuning voltage to said further diode when the tank circuit is to operate at the lowest frequency range.

17. A tank circuit as defined in claim 16 wherein there are a plurality of further diodes, all of which are effectively connected in parallel with each other.

18. A tank circuit as defined in claim 16 wherein said further diode is arranged in the region of said other end of said inner conductor.

19. A tank circuit as defined in claim 18, further comprising circuit means connected to said further diode for controlling the same.

20. A tank circuit as defined in claim 19 wherein said circuit means comprise push-button contacts for selectively connecting said further diode with a tuning voltage or with a forward bias voltage.

21. For use in a piece of communication equipment, a tank circuit comprising, in combination:

(a) an outer conductor;

(b) an inner conductor arranged within said outer conductor;

(c) capacitative tuning means connected to said inner conductor in the region of one end thereof;

(d) an inductance interposed between the other end of said inner conductor and said outer conductor; said inner conductor, when the tank circuit operates in the region of the lowest frequency, serving as a lead for said inductance; and (e) means for selectively short-circuiting said inner conductor to said outer conductor at any one of a plurality of points along the length of said inner conductor, thereby to enable the tank circuit to operate in higher frequency ranges;

(f) said tank circuit being in the form of printed circuitry, said printed circuitry comprises a low-loss dielectric plate, said outer conductor being constituted by conductive plating on both sides of said dielectric plate, said inner conductor being arranged within a recess with which said outer conductor is provided.

References Cited by the Examiner

UNITED STATES PATENTS

| | | | |
|---|---|---|---|
| 2,540,640 | 2/1951 | Young | 334—45 |
| 2,864,946 | 12/1958 | Achenbach | 325—464 |
| 3,177,453 | 4/1965 | Putzer | 334—45 |
| 3,204,198 | 8/1965 | Bachnick | 334—45 |

HERMAN KARL SAALBACH, *Primary Examiner.*

L. ALLAHUT, *Assistant Examiner.*